US012612422B2

(12) United States Patent
Biswas et al.

(10) Patent No.: US 12,612,422 B2
(45) Date of Patent: Apr. 28, 2026

(54) METHOD FOR MAKING A SILOXANE-(METH)ACRYLATE MACROMONOMER

(71) Applicants: Dow Silicones Corporation, Midland, MI (US); Dow Global Technologies LLC, Midland, MI (US)

(72) Inventors: Souvagya Biswas, Midland, MI (US); Jason Fisk, Midland, MI (US); Michael Telgenhoff, Midland, MI (US); Eric Joffre, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 346 days.

(21) Appl. No.: 18/257,404

(22) PCT Filed: Jan. 24, 2022

(86) PCT No.: PCT/US2022/013483
§ 371 (c)(1),
(2) Date: Jun. 14, 2023

(87) PCT Pub. No.: WO2022/197363
PCT Pub. Date: Sep. 22, 2022

(65) Prior Publication Data

US 2024/0124499 A1 Apr. 18, 2024

Related U.S. Application Data

(60) Provisional application No. 63/160,953, filed on Mar. 15, 2021.

(51) Int. Cl.
*C07F 7/08* (2006.01)
*C07F 7/18* (2006.01)

(52) U.S. Cl.
CPC .............. *C07F 7/0829* (2013.01); *C07F 7/18* (2013.01)

(58) Field of Classification Search
CPC ........ C07F 7/0829; C07F 7/14; C07F 7/0838; C08G 77/06
See application file for complete search history.

(56) References Cited

U.S. PATENT DOCUMENTS 2,823,218 A 2/1958 Speir et al.
3,159,601 A 12/1964 Ashby et al.
3,220,972 A 11/1965 Lamoreaux et al.
3,296,291 A 1/1967 Scotia et al.
3,398,017 A * 8/1968 Baurain .............. C04B 41/4961 556/440
3,419,593 A 12/1968 Willing et al.
3,516,946 A 6/1970 Scotia et al.
3,814,730 A 6/1974 Karstedt et al.
3,928,629 A 12/1975 Chandra et al.
3,989,668 A 11/1976 Lee et al.
4,482,670 A 11/1984 Saam et al.
4,558,111 A * 12/1985 Tolentino ............... C08G 77/38 556/440
4,766,176 A 8/1988 Lee et al.
4,784,879 A 11/1988 Lee et al.
4,988,788 A 1/1991 Takarada
5,017,654 A 5/1991 Togashi et al.
5,036,117 A 7/1991 Chung et al.
5,175,325 A 12/1992 Brown et al.
6,605,734 B2 8/2003 Roy et al.
8,470,925 B2 6/2013 Liu et al.
2017/0260393 A1 9/2017 Phukan et al.
2018/0312639 A1* 11/2018 Gammie ................ C08G 77/06

FOREIGN PATENT DOCUMENTS

EP 0347895 11/1993
JP 60166691 8/1985
WO 2022197363 9/2022

OTHER PUBLICATIONS

International Union of Pure and Applied Chemistry, Compendium of Chemical Terminology (IUPAC), Gold Book (Year: 2014).*
Methyldichlorosilane—PubChem (2005) (Year: 2005).*
Dierick, "User-Friendly Platinum Catalystss for the Highly Stereoselective Hydrosilylation of Alkynes and Alkenes", 2015, pp. 17073-17078, vol. 21, Chemistry—A European Journal.
Gigler, "Mechanistic insights into the hydrosilylation of allyl compound—Evidence for different coexisting reaction pathways", 2012, pp. 1-14, vol. 295, Journal of Catalysts.
Igarashi, "Ir-catalyzed hydrosilylation reaction of allyl acetate with octakis(dimethylsiloxy)octasilsesquioxane and related hydrosilanes", 2014, pp. 141-146, vol. 752, Journal of Organometallic Chemistry.
Manual of Patent Examining Procedure, 2018, 9th Edition.
Xiao, "Organosilicone modification of allyl methacrylate with speier's catalyst for waterborne self-matting styrene-acrylic emulsion", 2018, pp. 1-6, vol. 116, Progress in Organic Coatings.

* cited by examiner

*Primary Examiner* — Alexander R Pagano
*Assistant Examiner* — Frank S. Hou
(74) *Attorney, Agent, or Firm* — Catherine U. Brown

(57) ABSTRACT

A method for preparing a siloxane-(meth)acrylate macromonomer is provided. The method includes hydrosilylation, hydrolysis, and condensation. By-products of the method may be recycled to produce additional siloxane-(meth) acrylate macromonomer. An exemplary siloxane-(meth)acrylate macromonomer prepared by the method is 3-(1,1,1,3,5,5,5-heptamethyltrisiloxan-3-yl)propyl methacrylate.

17 Claims, No Drawings

METHOD FOR MAKING A SILOXANE-(METH)ACRYLATE MACROMONOMER

CROSS REFERENCE TO RELATED APPLICATIONS

This application is a U.S. national stage filing under 35 U.S.C. § 371 of PCT Application No. PCT/US22/013483 filed on 24 Jan. 2022, currently pending. which claims the benefit of U.S. Provisional Patent Application No. 63/160, 953 filed on 15 Mar. 2021 under 35 U.S.C. § 119 (e). PCT Application No. PCT/US22/013483 and U.S. Provisional Patent Application No. 63/160,953 are each hereby incorporated by reference.

TECHNICAL FIELD

This invention relates to a method for making a siloxane-(meth)acrylate macromonomer.

Introduction

Currently, siloxane-(meth)acrylate macromonomers can be synthesized via a direct platinum catalyzed hydrosilylation reaction of a (meth)acryloxy-functional alkenyl compound and a silyl hydride, as exemplified below in Equation 1 by the reaction of allyl methacrylate 1 with 1,1,1,3,5,5,5-heptamethyltrisiloxane 2. However, this direct reaction suffers from the drawbacks of poor yield, on the order of 45% to 55% of the desired product (exemplified by MD'M-ALMA 3 in Equation 1) with significant amounts of by-products, including an oxy-silylester and an alkylene hydrosilylated product (exemplified in Equation 1 by oxy-silyl ester 4 and propylene hydrosilylated adduct 5, respectively). The oxy-silylester by-product has a similar boiling point to the desired product, making distillation difficult, time consuming, and expensive.

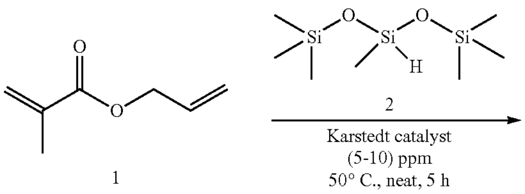

(Equation 1)

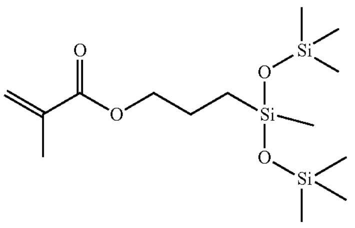

3

MD'M-ALMA (50%)

+

-continued

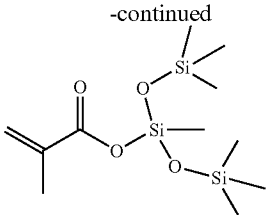

+

4 oxy-silyl ester (30%)

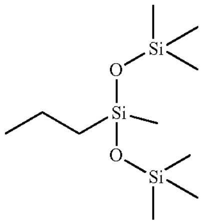

5 propylene hydrosilyated adduct (15%)

SUMMARY

A method for preparing a siloxane-(meth)acrylate macromonomer is disclosed. The method comprises:

(1) hydrosilylating starting materials comprising (A) a (meth)acrylate-functional alkenyl compound of formula

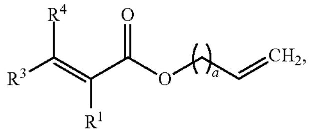

where $R^1$ is selected from the group consisting of H, alkyl, and aryl; $R^3$ is selected from the group consisting of H, alkyl, and aryl; $R^4$ is selected from the group consisting of H, alkyl, and aryl; and subscript a is an integer with a value of 1 to 6; and (B) a hydridosilane of formula

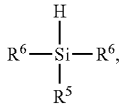

where $R^5$ is halogen or alkoxy, and each $R^6$ is independently selected from the group consisting of halogen, alkyl, aryl, and alkoxy; in the presence of (C) a hydrosilylation reaction catalyst;

optionally (D) a (meth)acrylate polymerization inhibitor; and optionally (E) a solvent; thereby forming a hydrosilylation reaction product comprising a (meth)acryloxyalkyl-functional silane of formula

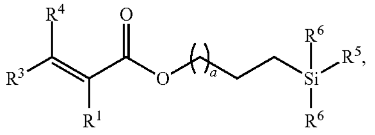

where $R^1$, $R^3$, $R^4$, $R^5$, $R^6$, and subscript a are as defined above;

(2) hydrolyzing compounds comprising (F) the (meth)acryloxyalkyl-functional silane prepared in step (1);

(G) water; and (H) an organosilane of formula $R^2{}_3SiR^5$, where $R^5$ is as described above, and $R^2$ is alkyl; thereby forming a hydrolysis product; and (3) removing all or a portion of the water from the hydrolysis product which comprises (K) the siloxane-(meth)acrylate macromonomer and a by-product comprising (L) a high boiling oligomer and (M) a low boiling oligomer.

DETAILED DESCRIPTION

Step (1) in the method described above may be performed by any convenient means. Step (1) may comprise mixing and heating the starting materials comprising (A) the (meth) acrylate-functional alkenyl compound, (B) the hydridosilane, and (C) the hydrosilylation catalyst (and, when present, (D) (meth)acrylate polymerization inhibitor and/or (E) the solvent at a temperature of 50° C. to 70° C. Step (2) in the method described above may be performed by any convenient means. Step (2) may comprise mixing starting materials comprising (F) the (meth)acryloxyalkyl-functional silane prepared in step (1), (G) water, and (H) the organosilane at 23° C.±2° C.

Step (3) in the method described above is performed after step (2). Step (3) may be performed one or more times during the method. For example, step (3) may comprise adding a drying agent after step (2), after step (4), or both. Alternatively, step (3) may comprise phase separating and decanting before step (4).

The method comprising steps (1), (2), and (3) described above may further comprise one or more optional additional steps. Optional step (4) is neutralizing the hydrolysis product by a technique comprising adding (I) a neutralizing agent; thereby forming a neutralized mixture. Step (4) may be performed after step (2) and/or after step (3). Step (4) may comprise mixing the neutralizing agent with the hydrolysis product at 23° C.±2° C. The method may optionally further comprise step (5), condensing the neutralized mixture prepared in step (4) by a technique comprising adding (J) a condensation catalyst; thereby preparing a reaction mixture comprising an additional amount of (K) the siloxane-(meth) acrylate macromonomer and an additional amount of the by-product comprising (L) the high boiling oligomer and (M) the low boiling oligomer, thereby forming a condensation reaction product. Step (5) may be performed with mixing and heating reaction mixture at a temperature of 50° C. to 70° C. Optional step (6) comprises quenching (J) the condensation catalyst by adding (N) a quenching agent to the condensation reaction product, thereby forming a quenched product comprising an inorganic salt of (J) the condensation catalyst and (N) the quenching agent. For example, ammonia gas may be bubbled through the condensation reaction product, and/or a base may be added to the condensation reaction product, optionally with heating and/or agitation to quench the condensation reaction product.

The method may optionally further comprise an additional step (7) to recycle by-product. The method produces the by-product comprising (L) the high boiling oligomer and (M) the low boiling oligomer in one or more of the steps described herein. Optional step (7) comprises equilibrating (L) the high boiling oligomer and (M) the low boiling oligomer in the presence of (O) an additional condensation catalyst; thereby forming a further additional amount of (K) the siloxane-(meth)acrylate macromonomer. The low boiling oligomer may be recycled from the by-product. Alternatively, the low boiling oligomer may be obtained from another source (e.g., fresh low boiling oligomer may be purchased, as described below).

The method further comprises step (8), recovering (K) the siloxane-(meth)acrylate macromonomer. Step (8) may be performed after all previous method steps. Alternatively, step (8) may be performed more than once during the method, i.e., after any step described above in which (K) the siloxane-(meth)acrylate macromonomer is produced. Step (8) may further comprise recovering the by-product comprising (L) the high boiling oligomer and/or (M) the low boiling oligomer so that the by-product may be recycled in the method (as described above). Step (8) may be performed by any convenient means. Step (8) may comprise one or more of filtration, centrifugation, and/or decanting to remove solid by-products, such as inorganic salts produced by the neutralization and quenching steps described above. Step (8) may comprise stripping, distillation, or both, with heating and optionally with reduced pressure. The starting materials used in the method, as well as intermediates, products, and by-products, are described in more detail below.

(A) (Meth)acrylate-Functional Alkenyl Compound

Starting material (A) is a (meth)acrylate-functional alkenyl compound of formula

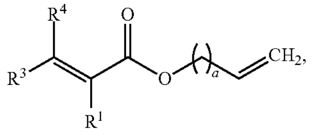

where $R^1$ is selected from the group consisting of H, alkyl, and aryl; $R^3$ is selected from the group consisting of H, alkyl, and aryl; $R^4$ is selected from the group consisting of H, alkyl, and aryl; and subscript a is an integer with a value of 1 to 6. Suitable alkyl groups for $R^1$, $R^3$ and $R^4$ may have 1 to 12 carbon atoms, alternatively 1 to 6 carbon atoms. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl (and branched isomers having 5 to 12 carbon atoms), and the alkyl groups are further exemplified by cycloalkyl groups such as cyclopropyl, cyclobutyl, cyclopentyl, and cyclohexyl. Alternatively, the alkyl group may be selected from the group consisting of methyl, ethyl, propyl and butyl; alternatively methyl, ethyl, and propyl; alternatively methyl and ethyl. Alternatively, the alkyl group may be methyl. Suitable aryl groups may be monocyclic or polycyclic and may have pendant hydrocarbyl groups. For example, the aryl groups include phenyl, tolyl, xylyl, and naphthyl and further include aralkyl groups such as benzyl, 1-phenylethyl and 2-phenylethyl. Alternatively, the aryl group may be monocyclic, such as phenyl, tolyl, or benzyl; alternatively the aryl group may be phenyl. Alternatively, $R^1$, $R^3$ and $R^4$ may each be selected from the group consisting of H and methyl. Alternatively, $R^1$ may be H. Alternatively, $R^3$ may be H. Alternatively, $R^4$ may be methyl. Examples of suitable commercially available compounds for starting material (A) include allyl (meth)acrylate. Suitable (meth)acrylate-functional alkenyl compounds are commercially available, e.g., from Sigma Aldrich, Inc. of St. Louis, Missouri, USA. Starting material (A) may be one (meth) acrylate-functional alkenyl compound or a combination of two or more of the (meth)acrylate-functional alkenyl compounds described above.

Starting material (A), the (meth)acrylate-functional alkenyl compound is present in an amount sufficient to provide a molar ratio of starting material (A):starting material (B), the hydridosilane [(A):(B) ratio] of 0.5:1 to 1.5:1. Alternatively, the (A):(B) ratio may be at least 0.75, alternatively at least 0.95, while at the same time the (A):(B) ratio may be up to 1.25:1, alternatively 1.05:1. Alternatively, the (A):(B) ratio may be 0.75:1 to 1.25:1, and alternatively 0.95:1 to 1.05:1.

(B) Hydridosilane

Starting material (B) is a hydridosilane of formula

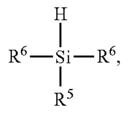

where $R^5$ is halogen or alkoxy, and each $R^6$ is independently selected from the group consisting of halogen, alkyl, aryl, and alkoxy, where alkyl and aryl are as described above for $R^1$. The halogen may be selected from bromo (Br), chloro (Cl), fluoro (F), and iodo (I); alternatively Br and Cl; and alternatively Cl. The alkoxy may be a group of formula $OR^7$, where $R^7$ is an alkyl group as described above for $R^1$. Alternatively each $R^6$ may be independently selected from the group consisting of halogen, alkyl, and aryl. Alternatively, each $R^6$ may be independently selected from the group consisting of halogen and alkyl. Examples of commercially available hydridosilanes include hydridohalosilanes such as dichloromethylsilane ($MeHSiCl_2$), dimethylchlorosilane ($Me_2HSiCl$), phenyldichlorosilane ($PhHSiCl_2$), diphenylchlorosilane ($Ph_2SiHCl$), ethyldichlorosilane ($EtHSiCl_2$), diethylchlorosilane ($Et_2HSiCl$), and a combination of two or more thereof. Suitable hydridosilanes are commercially available, e.g., from Sigma Aldrich, Inc., Dow Silicones Corporation of Midland, Michigan, USA, and Gelest, Inc. Starting material (B) may be one hydridosilane or a combination of two or more of the hydridosilanes described above.

(C) Hydrosilylation Reaction Catalyst

Starting material (C) is a hydrosilylation reaction catalyst. The hydrosilylation reaction catalyst will promote a reaction between the alkenyl groups in starting material (A) the (meth)acrylate-functional alkenyl compound and the silicon bonded hydrogen atoms in starting material (B) the hydridosilane. Said catalyst comprises a platinum group metal. The platinum group metal may be selected from the group consisting of platinum, rhodium, ruthenium, palladium, osmium, and iridium. Alternatively, the platinum group metal may be platinum. The hydrosilylation reaction catalyst may be (C1) the platinum group metal, described above; (C2) a compound of such a metal, for example, chlorotris (triphenylphosphine)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, (C3) a complex of the compound with a low molecular weight organopolysiloxane, or (C4) a platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be (C5) a compound or complex, as described above, microencapsulated in a resin matrix. Specific examples of suitable platinum-containing catalysts for use herein include chloroplatinic acid, either in hexahydrate form or anhydrous form, or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734 to Roy. These alkene-platinum-silyl complexes may be prepared, for example by mixing 0.015 mole $(COD)PtCl_2$ with 0.045 mole COD and 0.0612 moles $HMeSiCl_2$, where COD represents cyclooctadienyl. Other exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. Pat. No. 5,036,117 to Chung, et al.; and U.S. Pat. No. 5,175,325 to Brown; and EP 0 347 895 A to Togashi, et al. Suitable hydrosilylation reaction catalysts for starting material (C) are commercially available, for example, SYL-OFF™ 4000 Catalyst and SYL-OFF™ 2700 are available from Dow Silicones Corporation of Midland, Michigan, USA.

Starting material (C) may be one hydrosilylation reaction catalyst or a combination of two or more of the hydrosilylation reaction catalysts described above. The amount of (C) the hydrosilylation reaction catalyst in the composition will depend on various factors including the selection of starting materials (A), (B), and (C), however, the amount of catalyst is sufficient to catalyze hydrosilylation reaction of SiH and alkenyl groups, alternatively the amount of catalyst is sufficient to provide at least 0.01 ppm, alternatively at least 0.05 ppm, alternatively at least 0.1 ppm, alternatively at least 0.5 ppm, and alternatively at least 1 ppm, by mass of the platinum group metal based on combined amounts of starting materials (A), (B), (C), used in step (1) of the method described herein. At the same time, the amount of catalyst is sufficient to provide up to 800 ppm, alternatively up to 500 ppm, and alternatively up to 100 ppm by mass of the platinum group metal, on the same basis.

(D) (Meth)acrylate Polymerization Inhibitor

Starting material (D) is a (meth)acrylate polymerization inhibitor (inhibitor) that may optionally be added in step 1)

of the method described above. When present, starting material (D), the inhibitor, may be used in an amount >0 to <0.01% based on weight of (K) the silicone-(meth)acrylate macromonomer, alternatively >0 to <2,000 ppm, alternatively 1 ppm to 1818 ppm, alternatively 10 ppm to 500 ppm, on the same basis. Starting material (D) the (meth)acrylate polymerization inhibitor is selected from the group consisting of (D1) a phenolic compound, (D2) a quinone compound, (D3) a hydroquinone compound, (D4) an N-oxyl compound, (D5) a phenothiazine compound, (D6) a hindered amine compound, and (D7) a combination of two or more of (D1) to (D6). Suitable inhibitors for starting material (D) are commercially available, and include, for example, nitrobenzene, butylated hydroxyl toluene, diphenyl picryl hydrazyl (DPPH), p-methoxyphenol, 2,4-di-t-butyl catechol, phenothiazine, N,N-diethylhydroxylamine, salts of N-nitroso phenylhydroxylamine, (2,2,6,6-tetramethylpiperidin-1-yl)oxidanyl (TEMPO), and 4-hydroxy-(2,2,6,6-tetramethylpiperidin-1-yl)oxidanyl (4-hydroxy TEMPO). Suitable inhibitors are commercially available, e.g. from Sigma Aldrich, Inc. Starting material (D) may be one inhibitor or a combination of two or more of the inhibitors described above.

(E) Solvent

Starting material (E) is a solvent, which may be used to facilitate mixing of one or more of the starting materials. For example, (C) the hydrosilylation reaction catalyst may be delivered in a solvent. Suitable solvents include a polydialkylsiloxane, an aromatic hydrocarbon, an aliphatic hydrocarbons, and a combination of two or more thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Michigan, U.S.A. The aromatic hydrocarbon may have 6 to 20 carbon atoms, such as benzene, toluene, or xylene. The aliphatic hydrocarbon is exemplified by heptane, hexane, cyclohexane, or octane, or isoparaffinic solvents. The hydrocarbon solvents are commercially available from various sources, such as Sigma Aldrich, Inc. of St. Louis, Missouri, USA. Starting material (E) may be one solvent or a combination of two or more of the solvents described above.

The amount of solvent will depend on various factors including the type of solvent selected and the amount and type of other starting materials selected for use in the method. However, the amount of solvent may be 0% to 25%, based on combined weights of all starting materials used in step (1).

(F) (Meth)acryloxyalkyl-Functional Silane

The hydrosilylation reaction product prepared in step (1) of the method described above comprises a (meth)acryloxyalkyl-functional silane of formula

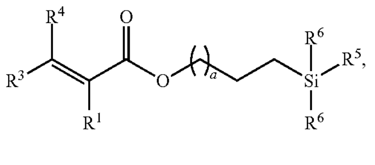

where $R^1$, $R^3$, $R^4$, $R^5$, $R^6$, and subscript a are as defined above. Alternatively, in this formula, one instance of $R^6$ may be halogen, such as Cl. Alternatively, both instances of $R^6$ may be alkyl or aryl; alternatively both instances of $R^6$ may be alkyl, such as methyl. Alternatively, one instance of $R^6$ may be halogen and one instance of $R^6$ may be alkyl.

(G) Water

Starting material (G) used in step (2) of the method is water. The water is not generally limited, and may be utilized neat (i.e., absent any carrier vehicles/solvents), and/or pure (i.e., free from or substantially free from minerals and/or other impurities). For example, the water may be processed or unprocessed. Examples of processes that may be used for purifying the water include distilling, filtering, deionizing, and combinations of two or more thereof, such that the water may be deionized, distilled, and/or filtered. Alternatively, the water may be unprocessed (e.g. may be tap water, i.e., provided by a municipal water system or well water, used without further purification). Alternatively, the water may be purified before step (2). Alternatively, the water may be utilized as a mixture (e.g. solution or suspension) comprising a solvent, such as any of those listed above. The water may be utilized in an amount, which will be selected by one of skill in the art, depending on various factors, e.g., the particular organosilane (H) selected, and the halogen contents of (F) the (meth)acryloxyalkyl-functional silane and (H) the organosilane. However, the amount of water added in step (2) may be 2 moles to 1,000 moles per mole of the (meth)acryloxyalkyl-functional silane. Alternatively, the amount of water may be 5 to 900, alternatively 10 to 800, alternatively 15 to 700, alternatively 20 to 600, alternatively 25 to 500, alternatively 30 to 400, alternatively 35 to 300, alternatively 40 to 200, alternatively 50 to 200, and alternatively 100 to 150 moles, on the same basis.

(H) Organosilane

Starting material (H) is an organosilane of formula $R^2_3SiR^5$, where $R^5$ is as described above, and each $R^2$ is independently selected from the group consisting of alkyl and aryl, which are as described above for $R^1$. Examples of organosilanes for use in the method herein may be an organosilane selected from the group consisting of chlorotrimethylsilane ($Me_3SiCl$), triphenylchlorosilane ($Ph_3SiCl$), dimethylvinylchlorosilane ($Me_2ViSiCl$), and a combination of two or more thereof. Organosilanes are known in the art and are commercially available from various sources, such as Dow Silicones Corporation of Midland, Michigan, USA and Gelest, Inc. of Morrisville, Pennsylvania, USA. Starting material (H) may be one organosilane or a combination of two or more of the organosilanes described above. The amount of (H) the organosilane may be 0.5 moles to 100 moles of organosilane per mole of (F) the (meth)acryloxyalkyl-functional silane. Alternatively, the amount of (H) the organosilane may be 0.6 to 90, alternatively 0.7 to 80, alternatively 0.8 to 70, alternatively 0.9 to 80, alternatively 1 to 70, alternatively 1.1 to 60, alternatively 1.2 to 50, alternatively 1.3 to 40, alternatively 1.4 to 30, alternatively 1.5 to 20, alternatively 1.6 to 20, alternatively 1.7 to 15, alternatively 1.8 to 10, alternatively 1.9 to 5, and alternatively 2 to 4 moles of (H) the organosilane on the same basis.

(I) Neutralizing Agent

Starting material (I) is a neutralizing agent added when optional step (4) is included in the method described above.

The neutralizing agent can be any compound suitable for neutralizing an acid such as a side product of the hydrolysis and condensation, (e.g., an acid of formula $HR^5$ where $R^5$ is as described above, such as HCl). The neutralizing agent may comprise ammonia gas. Alternatively, the neutralizing agent may be a carbonate, a bicarbonate, or a combination thereof. For example, the neutralizing agent may comprise comprises sodium bicarbonate, potassium bicarbonate, sodium carbonate, potassium carbonate, magnesium carbonate, calcium carbonate; or a combination thereof. Alternatively, the neutralizing agent may comprise hydrotalcite. Suitable neutralizing agents are commercially available, e.g., from Fisher Chemical of Waltham, Massachusetts, USA. Starting material (I) may be one neutralizing agent or a combination of two or more of the neutralizing agents described above. The amount of neutralizing agent depends on various factors including the particular neutralizing agent selected and the amount of acid present, however, 1 equivalent to 100 equivalents based on weight of the organosilane. Alternatively, the amount of neutralizing agent may be 1.5 to 75, alternatively 2 to 50, alternatively 3 to 25, and alternatively 4 to 10 equivalents, on the same basis.

(J) Condensation Catalyst

Starting material (J) is a condensation catalyst. The condensation catalyst may be a strong acid, such as sulfuric acid or a sulfonic acid, e.g., para-toluenesulfonic acid monohydrate, trifluoromethane sulfonic acid, heterogenous sulfonic acid resin catalyst, or a combination thereof. Examples of such strong acids are known in the art, for example, as described in U.S. Pat. No. 4,482,670 to Saam et al. Alternatively, the condensation catalyst may be a strong base, such as potassium hydroxide, potassium methoxide, sodium hydroxide, sodium methoxide, a potassium silanolate, or a combination of two or more thereof. Examples of such strong bases are known in the art, as described in U.S. Pat. No. 8,470,925 to Liu et al. Suitable strong acids and bases for use as (J) the condensation catalyst are commercially available, e.g., from Sigma Aldrich, Inc. Starting material (J) may be one strong acid or a combination of two or more of the strong acids described above. Alternatively, starting material (J) may be one strong base or a combination of two or more of the strong bases described above. The amount of (J) the condensation catalyst depends on various factors including the catalyst selectivity and the selection of $R^6$, however, the amount of (J) the condensation catalyst may be 0.01% to 10% based on weight of the starting materials used in step (5) of the method described above. Alternatively, the amount of (J) the condensation catalyst may be 0.1% to 5%, alternatively 0.5% to 2%, and alternatively 1%, on the same basis.

(K) Siloxane-(Meth)acrylate Macromonomer

The siloxane-(meth)acrylate macromonomer, (K), formed by the method has formula:

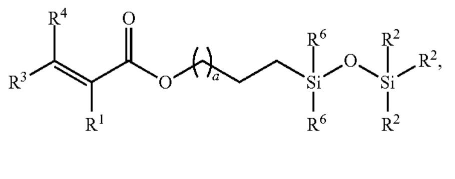

where $R^1$, $R^2$, $R^3$, $R^4$, and subscript a are as described above, and each $R^7$ is independently selected from alkyl, aryl, and a group of formula $[(R^2)_3SiO_{1/2}]$. Alternatively, at least one instance $R^7$ is the group of formula $[(R^2{}_3)SiO_{1/2}]$. Alternatively, both instances of $R^7$ are the group of formula $[(R^2{}_3)SiO_{1/2}]$. Alternatively, one instance of $R^7$ may be the group of formula $[(R^2)_3SiO_{1/2}]$ and one instance of $R^7$ may be an alkyl group. The alkyl group may be methyl. Examples of siloxane-(meth)acrylate macromonomers prepared by the method include 3-(1,1,1,3,5,5,5-heptamethyltrisiloxan-3-yl) propyl methacrylate.

When (K) the siloxane-(meth) acrylate macromonomer forms, a by-product comprising (L) a high boiling oligomer and (M) a low boiling oligomer may also form. The term 'high boiling' means that (L) the high boiling oligomer has a higher boiling point than (K) the siloxane-(meth) acrylate macromonomer, and the term 'low boiling' means that (M) the low boiling oligomer has a lower boiling point than (K) the siloxane-(meth) acrylate macromonomer. When a reaction product comprising (K), (L), and (M) is distilled, (M) the low boiling oligomer may come off in a light cut, and (L) the high boiling oligomer comes off in a bottoms cut.

(L) High Boiling Oligomer

The high boiling oligomer may comprise unit formula:

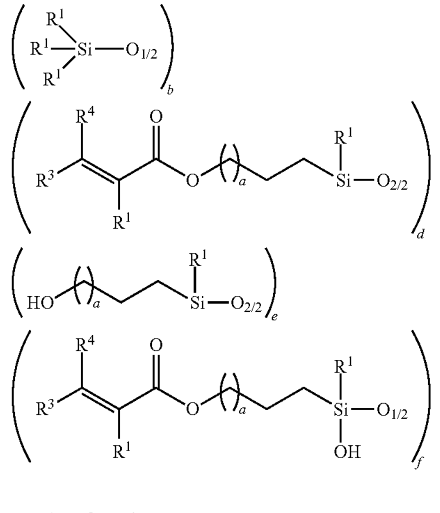

where $R^1$, $R^3$, $R^4$, and subscript a are as described above, subscript b is 0, 1, or 2, subscript f is 0, 1 or 2, a quantity (b+f)=2, and subscript d may be 2 to 10, alternatively 2 to 4, subscript e may be 0 to 9, alternatively 0 or 1, and a quantity (d+e) may be 2 to 10, alternatively 2 to 4.

(M) Low Boiling Oligomer

The low boiling oligomer may have formula $R^2{}_3Si—O—SiR_2{}^3$, where $R^2$ is as described above. Starting material (M) may comprise hexamethyldisiloxane. The low boiling oligomer may be produced (by-product) of one or more steps in the method described above. In addition to the low boiling oligomer so produced, low boiling oligomers such as hexamethyldisiloxane are also commercially available, e.g., from Dow Silicones Corporation and Gelest, Inc. Fresh low boiling oligomer may be purchased and optionally added in one of steps (3) to (7) described above.

(N) Quenching Agent

Starting material (N) is a quenching agent added when optional step (6) is included in the method described above. The quenching agent can be any compound suitable for quenching (J) the condensation catalyst, described above. The quenching agent may be the same as or different from (I) the neutralizing agent described above. The quenching agent may comprise ammonia gas, and step (6) may comprise bubbling ammonia gas through the condensation reaction product. Alternatively, the quenching agent may be a base (quenching may be performed by adding a base). The base may be pyridine, imidazole, and/or a hydroxide of a quaternary ammonium cations. Suitable quenching agents are commercially available, e.g., from Fisher Chemical of Waltham, Massachusetts, USA. Starting material (N) may be one quenching agent or a combination of two or more of the quenching agents described above. The amount of quenching agent depends on various factors including the particular quenching agent selected and the amount of (J) the condensation catalyst present, however, the amount of quenching agent may be 0.01% to 10% based on weight (J) the condensation catalyst. Alternatively, the amount of (N) the quenching agent may be 0.1% to 5%, alternatively 0.5% to 2%, and alternatively 1%, on the same basis equivalent to 100 equivalents based on weight of the (J) condensation reaction catalyst. Alternatively, the amount of neutralizing agent may be 1.5 to 75, alternatively 2 to 50, alternatively 3 to 25, and alternatively 4 to 10 equivalents, on the same basis.

(O) Additional Condensation Catalyst

Starting material (O) is an additional condensation catalyst as described above for starting material (J). Starting material (O) can be added when step (7) is present in the method. The additional condensation catalyst may be the same as, or different from, the condensation catalyst selected for starting material (J) used in step (4). The amount of additional condensation catalyst used in step (7). Starting material (O) may be one strong acid or a combination of two or more of the strong acids described above. Alternatively, Starting material (O) may be one strong base or a combination of two or more of the strong bases described above. The amount of (O) the additional condensation catalyst depends on various factors including the catalyst selectivity and the selection of $R^6$, however, the amount of (O) the additional condensation catalyst may be 0.01% to 10% based on weight of the starting materials used in step (5) of the method described above. Alternatively, the amount of (O) the additional condensation catalyst may be 0.1% to 5%, alternatively 0.5% to 2%, and alternatively 1%, on the same basis.

EXAMPLES

These examples are intended to illustrate the invention to one of ordinary skill in the art and should not be interpreted to limit the scope of the invention set forth in the claims. Starting materials used in these examples are shown below in Table 1.

TABLE 1

| Starting Materials | | |
|---|---|---|
| Abbreviation | Chemical Description | Source |
| A1 AMA | Allyl methacrylate | Sigma-Aldrich |
| D1 4-hydroxy TEMPO Inhibitor | 4-hydroxy (2,2,6,6-tetramethylpiperidin-1-yl)oxyl? | Sigma-Aldrich |
| C1/E1 | Karstedt's Catalyst (in an amount sufficient to provide 2% Platinum) dissolved in xylenes | Sigma-Aldrich |
| B1 | Dichloromethylsilane $(CH_3)HSiCl_2$ | Sigma-Aldrich |
| F1 $Cl_2(Me)Si$-ALMA | methacryloxypropyldichloromethylsilane | Synthesized according to example 1 |
| H1 TMS-Cl | Chlorotrimethylsilane $(Me_3SiCl)$ | Sigma-Aldrich |
| G1 | water | DI water |
| MD'M-ALMA | 3-(1,1,1,3,5,5,5-heptamethyltrisiloxan-3-yl)propyl methacrylate | Synthesized according to Examples 2 and 3. |
| I1 neutralizing agent | $NaHCO_3$ | Fisher Chemical |
| Drying Agent | $Na_2SO_4$ | Fisher Chemical |
| J1 and O1 | para-toluenesulfonic acid monohydrate | Sigma-Aldrich |
| M1 HMDS | hexamethyldisiloxane | By-product of step 2) |

Example 1: Synthesis of MD'M-ALMA, Step 1

In this example 1, methacryloxypropyldichloromethylsilane was prepared as follows.

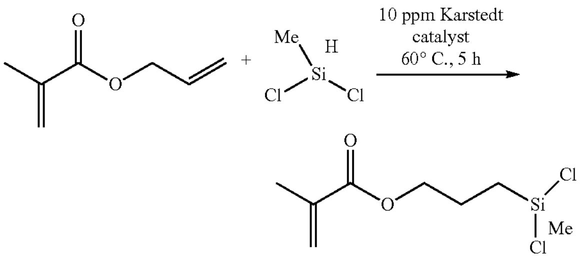

b-isomer (> 95%)

-continued

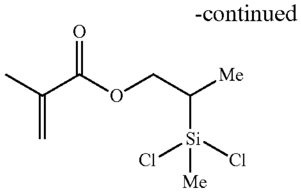

branched isomer
(not detected)

In a nitrogen-purged glove-box, 31.5 g (250 mmol) of allyl methacrylate was charged inside a 220 mL glass jar. Into the glass jar, 60-65 mg of 4-Hydroxy TEMPO (1000 ppm) and 25 μL (10 ppm) of Karstedt's catalyst (2% Pt in Xylenes) was added and it was heated to 60° C. using a heat block. Once the jar reached equilibrium temperature, 30.2 g (262.5 mmol) of dichloromethylsilane was dropwise added by addition funnel. Halfway through the addition, another 10 μL of Karstedt's catalyst (2% Pt in xylenes) was added for the completion of the reaction. The heating block was removed and the reaction was allowed to exotherm and monitored by GC-MS. The reaction was complete within 3-5 h.

GC-FID was run with standard conditions (50° C. for 2 mins, 20° C./min ramp to 250° C. and hold temp at 250° C. for 10 mins). No formation of an oxy-silyl ester was observed. No propylene elimination was observed. This reaction showed very clean conversion towards hydrosilylated product with no detectable branched isomer.

Once the GC-FID showed no more starting material left, the stirring was stopped, 60.2 g reaction product was obtained and directly used for the next step without further purification.

Example 2: Synthesis of MD'M-ALMA, Step 2

In this example 2, methacryloxypropyldichloromethylsilane (430 mmol, 103 g) and chlorotrimethylsilane (TMS-Cl, 900 mmol, 100 g) were premixed inside a 500 mL round bottom flask inside the glove-box. The flask was taken out from the glove-box, and the contents were slowly added to water (1.25 L, 75 mol) inside a 2 L round bottom flask via an addition funnel in open air over 1 h. The reaction was vigorously stirred at room temperature. Once the addition was complete, the contents of the flask were stirred for another 15 mins. An aliquot was taken out and analyzed by GC-FID.

Example 3: Synthesis of MD'M-ALMA, Steps 3—

The reaction mixture prepared in Example 2 was transferred to a separatory funnel to separate out the organic phase from the aqueous layer. After repeated separations, all the organic layers were collected and washed with $NaHCO_3$ solution to neutralize any acid and dried over anhydrous $Na_2SO_4$ before transferring to a 1 L round bottom flask.

900 mg para-toluenesulfonic acid monohydrate (1 wt %) was then added to the flask, which was placed over a pre-heated (60° C.) metal block under nitrogen atmosphere. The reaction mixture was kept at 60° C. for 30 mins for equilibrium. After 30 mins, the reaction mixture was cooled down to RT, and another GC aliquot was taken and analyzed by GC-FID. The GC-FID analysis showed the product distribution as shown below in Table 2.

TABLE 2

Product Distribution after the Hydrolysis Reaction (Measured by GC-FID)

| Conditions | MD'M-ALMA | High Boiling Oligomers | HMDS |
|---|---|---|---|
| After addition of acid, 30 mins, 60° C. | 43 | 19 | 39 |

Example 4: Synthesis of MD'M-ALMA

After equilibration in example 3, the resulting reaction mixture was neutralized by bubbling ammonia gas through the reaction mixture to quench all residual para-toluenesulfonic acid. A white inorganic salt was formed, and the reaction mixture was filtered to remove all the inorganic salt before transferring to a distillation flask, which was connected with a short-path distillation column that was used to strip out the low boiling hexamethyldisiloxane and MD'M-ALMA.

Relatively high quality MD'M-ALMA was recovered from the short path distillation:

MD'M-ALMA purity=95.7%

MD'M-ALMA yield=28%

Very little product loss observed in the light and bottoms distillation cuts.

| Product | Amount (g) | MD'M-ALMA Product Purity (%) | Amount (g) | MD'M-ALMA Yield (%) |
|---|---|---|---|---|
| Isolated MD'M-ALMA Product | 43.9 | 95.7% | 42.0 | 28.2% |
| Lights Cut Day 1 | 34.5 | 0.0% | 0.0 | 0.0% |
| Lights Cut Day 2 | 5.3 | 0.0% | 0.0 | 0.0% |
| Lights Cut Day 3 | 4.8 | 1.1% | 0.1 | 0.03% |
| Distillation bottoms | 48.5 | 1.2% | 0.6 | 0.38% |
| Totals: | 137.0 | | 42.6 | 28.6% |

Example 5

Once the MD'M-ALMA and hexamethyldisiloxane were removed from the reaction mixture prepared as described above, the distillation bottoms (containing high boiling oligomer) were combined with the hexamethyldisiloxane (lights) and treated back with para-toluenesulfonic acid monohydrate at 60-70° C. The reaction progress was monitored by GC-FID, and slow regeneration of MD'M-ALMA was observed inside the reaction mixture through the re-equilibrium chemistry. The results are shown in the Table below.

| Sample | HMDS (GC-FID %) | MD'M-ALMA (GC-FID %) | High Boiling Oligomers (GC-FID %) |
|---|---|---|---|
| Lights/Bottoms (combined before example 5) | 45.3 | 0.9 | 37.5 |
| After Equilibration | 37.6 | 16.0 | 29.2 |

Definitions and Usage of Terms

All amounts, ratios, and percentages herein are by weight, unless otherwise indicated. The SUMMARY and ABSTRACT are hereby incorporated by reference. The articles, "a", "an", and "the" each refer to one or more, unless otherwise indicated by the context of the specification. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in the Abbreviations Table, below.

Abbreviations Table

| Abbreviation | Definition |
|---|---|
| ° C. | degrees Celsius |
| Et | ethyl |
| g | grams |
| HMDS | hexamethyldisiloxane |
| MD'M-ALMA | 3-(1,1,1,3,5,5,5-heptamethyltrisiloxan-3-yl)propyl methacrylate, of formula 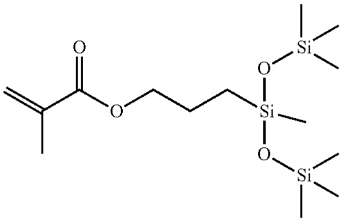 |
| Me | methyl |
| (meth)acrylate | class of compound or functional group including an acrylate, a methacrylate, or both. |
| min | minutes |
| mL | milliliters |
| Ph | phenyl |
| ppm | parts per million |
| RPM | revolutions per minute |
| RT | room temperature of 23° C. ± 2° C. |
| Vi | vinyl |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the following embodiments and claims.

Furthermore, any ranges and subranges relied upon in describing the present invention independently and collectively fall within the scope of the following embodiments and claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and any other subrange subsumed within the range. As just one example, a range of "50 to 70" may be further delineated into a lower third, i.e., 50 to 56, a middle third, i.e., 57 to 63, and an upper third, i.e., from 64 to 70, and alternatively, the range "50 to 70" includes the subrange "60 to 70", each of which individually and collectively are within the scope of the following embodiments and claims, and may be relied upon individually and/or collectively and provide adequate support for specific embodiments within the scope of the following embodiments and claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a method for preparing a siloxane-(meth)acrylate macromonomer comprises the steps of:

(1) hydrosilylating starting materials comprising (A) a (meth)acrylate-functional alkenyl compound of formula

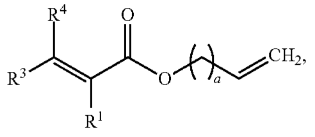

where $R^1$ is selected from the group consisting of H, alkyl, and aryl; $R^3$ is selected from the group consisting of H, alkyl, and aryl; $R^4$ is selected from the group consisting of H, alkyl, and aryl; and subscript a is an integer with a value of 1 to 6; and (B) a hydridohalosilane of formula

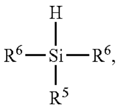

where $R^5$ is halogen, and each $R^6$ is independently selected from the group consisting of halogen and alkyl; in the presence of (C) a hydrosilylation reaction catalyst;

optionally (D) a (meth)acrylate polymerization inhibitor; and optionally (E) a solvent; thereby forming a hydrosilylation reaction product comprising a (meth)acryloxyalkyl-functional halosilane of formula

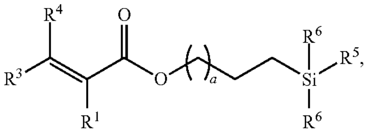

where $R^1$, $R^3$, $R^4$, $R^5$, $R^6$, and subscript a are as defined above;

(2) hydrolyzing compounds comprising (F) the (meth)acryloxyalkyl-functional halosilane prepared in step (1);

(G) water; and (H) an organohalosilane of formula $R^2_3SiR^5$, where $R^5$ is as described above, and $R^2$ is alkyl; thereby forming a hydrolysis product;

(3) removing all or a portion of the water from the hydrolysis product which comprises (K) the siloxane-(meth)acrylate macromonomer and a by-product comprising (L) a high boiling oligomer of unit formula

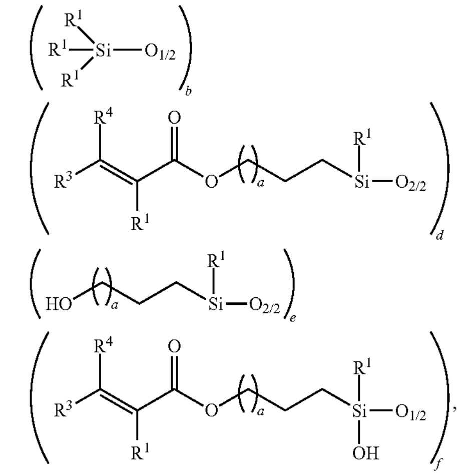

where $R^1$, $R^3$, $R^4$, and subscript a are as described above, subscript b is 0, 1, or 2, subscript f is 0, 1, or 2, a quantity (b+f)=2, and subscript d is 2 to 4, subscript e is 0 or 1, and a quantity (d+e) is 2 to 4; and (M) a low boiling oligomer of formula $R^2_3Si—O—SiR^2_3$, where $R^2$ is as described above;

optionally (4) neutralizing the hydrolysis product by a technique comprising adding (I) a neutralizing agent; thereby forming a neutralized mixture;

optionally (5) condensing the neutralized mixture by a technique comprising adding (J) a condensation catalyst; thereby preparing a reaction mixture comprising an additional amount of (K) the siloxane-(meth)acrylate macromonomer and additional amount of the by-product comprising (L) the high boiling oligomer and (M) the low boiling oligomer; thereby forming a condensation reaction product; and optionally (6) quenching (J) the condensation catalyst by adding (N) a quenching agent to the condensation reaction product, thereby forming a quenched product comprising an inorganic salt of (J) the acid catalyst and (N) the quenching agent;

optionally (7) equilibrating (L) the high boiling oligomer and (M) the low boiling oligomer in the presence of (O) an additional condensation catalyst (formed in any of the preceding steps); thereby forming a further additional amount of (K) the siloxane-(meth)acrylate macromonomer; and (8) recovering (K) the siloxane-(meth)acrylate macromonomer.

In a second embodiment, the method of the first embodiment further comprises recovering (L) the high boiling oligomer.

In a third embodiment, the method of the first or the second embodiment further comprises recovering (M) the low boiling oligomer.

In a fourth embodiment, the method of any one of the preceding embodiments, further comprises adding additional fresh (M) low boiling oligomer.

In a fifth embodiment, the method of the fourth embodiment further comprises equilibrating (L) the high boiling oligomer and (M) the low boiling oligomer in the presence of (O) an additional acid catalyst, thereby forming an additional amount of the siloxane-(meth)acrylate macromonomer.

In a sixth embodiment, in the method of any one of the preceding embodiments, (A) the (meth)acrylate-functional alkenyl compound has formula

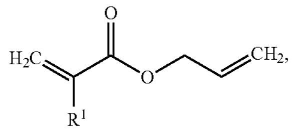

where $R^1$ is selected from the group consisting of H and methyl, and subscript a is as described above.

In a seventh embodiment, in the method of any one of the preceding embodiments, (A) the (meth)acrylate-functional alkenyl compound is selected from the group consisting of allyl acrylate and allyl methacrylate.

In an eighth embodiment, in the method of any one of the preceding embodiments, in (B) the hydridohalosilane, each $R^5$ is Cl.

In a ninth embodiment, in the method of any one of the preceding embodiments, (B) the hydridohalosilane is selected from the group consisting of dichloromethylsilane ($MeHSiCl_2$), dimethylchlorosilane ($Me_2HSiCl$), phenyldichlorosilane ($PhHSiCl_2$), diphenylchlorosilane ($Ph_2SiHCl$), ethyldichlorosilane ($EtHSiCl_2$), diethylchlorosilane ($Et_2HSiCl$), and a combination of two or more thereof.

In a tenth embodiment, in the method of any one of the preceding embodiments, (C) the hydrosilylation reaction catalyst is selected from the group consisting of (C1) a platinum group metal, (C2) a compound of the platinum group metal, (C3) a complex of the compound with an alkenyl-functional organopolysiloxane oligomer, (C4) the compound microencapsulated in a matrix or coreshell type structure, and (C5) the complex of the compound microencapsulated in a resin matrix.

In an eleventh embodiment, in the method of the tenth embodiment, the platinum group metal is platinum.

In a twelfth embodiment, in the method of any one of the preceding embodiments, (D) the (meth)acrylate polymerization inhibitor is present.

In a thirteenth embodiment, in the method of the twelfth embodiment, (D) the (meth)acrylate polymerization inhibitor is selected from the group consisting of (D1) a phenolic compound, (D2) a quinone compound, (D3) a hydroquinone compound, (D4) an N-oxyl compound, (D5) a phenothiazine compound, (D6) a hindered amine compound, and (D7) a combination of two or more of (D1) to (D6).

In a fourteenth embodiment, in the method of the twelfth embodiment or the thirteenth embodiment, (D) the (meth) acrylate polymerization inhibitor is an N-oxyl compound selected from the group consisting of (2,2,6,6-tetramethylpiperidin-1-yl)oxyl (TEMPO), 4-hydroxy (2,2,6,6-tetramethylpiperidin-1-yl)oxyl, bis(2,2,6,6-tetramethylpiperidin-1-yl) oxyl sebacate (Bis-TEMPO), polymer-bound TEMPO, and a combination of two or more thereof.

In a fifteenth embodiment, in the method of any one of the first to fourteenth embodiments, (E) the solvent is present.

In a sixteenth embodiment, in the method of the fifteenth embodiment, (E) the solvent is selected from the group consisting of aliphatic hydrocarbons, aromatic hydrocarbons, and combinations of two or more thereof.

In a seventeenth embodiment, in the method of any one of the preceding embodiments, step (1) comprises mixing and heating the starting materials at a temperature of 50° C. to 70° C.

In an eighteenth embodiment, in the method of any one of the preceding embodiments, (H) the organohalosilane has formula $R^2_3SiR^5$, where $R^2$ is as described above and $R^5$ is Cl.

In a nineteenth embodiment, in the method of the eighteenth embodiment, (H) the organohalosilane is selected from the group consisting of chlorotrimethylsilane ($Me_3SiCl$), triphenylchlorosilane ($Ph_3SiCl$), dimethylvinylchlorosilane ($Me_2ViSiCl$), and a combination of two or more thereof.

In a twentieth embodiment, in the method of any one of the preceding embodiments, step (2) comprises mixing at 23° C.±2° C.

In a twenty-first embodiment, in the method of any one of the preceding embodiments, step (3) comprises phase separating and decanting before step (4).

In a twenty-second embodiment, in the method of any one of the preceding embodiments, step (3) comprises adding a drying agent after step (4).

In a twenty-third embodiment, in the method of any one of the preceding embodiments, step (4) is present, and step (4) comprises mixing the neutralizing agent with the hydrolysis product at 23° C.±2° C.

In a twenty-fourth embodiment, in the method of the twenty-third embodiment, the neutralizing agent is selected from the group consisting of ammonia gas, a carbonate, a bicarbonate, hydrotalcite, or a combination of two or more thereof.

In a twenty-fifth embodiment, in the method of any one of the preceding embodiments, (J) the condensation catalyst is a strong acid or a strong base.

In a twenty-sixth embodiment, in the method of any one of the preceding embodiments, (J) the condensation catalyst is selected from the group consisting of sulfuric acid, a sulfonic acid, potassium hydroxide, potassium methoxide, sodium hydroxide, sodium methoxide, a potassium silanolate, and a combination of two or more thereof.

In a twenty-seventh embodiment, in the method of any one of the preceding embodiments, (M) the low boiling oligomer comprises hexamethyldisiloxane.

In a twenty-eighth embodiment, in the method of any one of the preceding embodiments, step (5) is present, and step (5) comprises mixing and heating at a temperature of 50° C. to 70° C.

In a twenty-ninth embodiment, in the method of the twenty-eighth embodiment, step (6) is present.

In a thirtieth embodiment, in the method of the twenty-ninth embodiment, (N) the quenching agent comprises ammonia gas, and step (6) comprises bubbling ammonia gas through the condensation reaction product.

In a thirty-first embodiment, in the method of any one of the preceding embodiments, step (7) is present.

In a thirty-second embodiment, in the method of the thirty-first embodiment, in step (7), (O) the additional condensation catalyst is a strong acid or a strong base.

In a thirty-third embodiment, in the method of the thirty-second embodiment, (O) the additional condensation catalyst is selected from the group consisting of sulfuric acid, a sulfonic acid, potassium hydroxide, potassium methoxide, sodium hydroxide, sodium methoxide, a potassium silanolate, and a combination of two or more thereof.

In a thirty-fourth embodiment, in the method of any one of the preceding embodiments, step (8) comprises stripping, distillation, or both.

In a thirty-fifth embodiment, the siloxane-(meth)acrylate macromonomer is prepared by the method of any one of the preceding embodiments.

In a thirty-sixth embodiment, the siloxane-(meth)acrylate macromonomer of the thirty-fifth embodiment has formula:

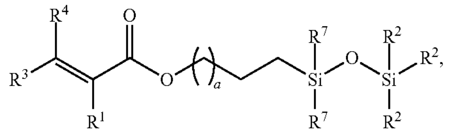

where $R^1$, $R^2$, $R^3$, $R^4$, and subscript a are as described above, and each $R^7$ is independently selected from alkyl and a group of formula $—OSiR^2_3$.

The invention claimed is:

1. A method for preparing a siloxane-(meth)acrylate macromonomer, wherein the method comprises:

(1) hydrosilylating starting materials comprising (A) a (meth)acrylate-functional alkenyl compound of formula

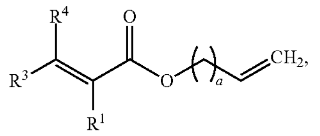

where $R^1$ is selected from the group consisting of H, alkyl, and aryl; $R^3$ is selected from the group consisting of H, alkyl, and aryl; $R^4$ is selected from the group consisting of H, alkyl, and aryl; and subscript a is an integer with a value of 1 to 6; and (B) a hydridosilane of formula

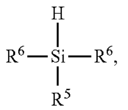

where $R^5$ is halogen or alkoxy, and each $R^6$ is independently selected from the group consisting of halogen, alkyl, aryl, and alkoxy; in the presence of (C) a hydrosilylation reaction catalyst;

optionally (D) a (meth)acrylate polymerization inhibitor; and optionally (E) a solvent; thereby forming a hydrosilylation reaction product comprising a (meth)acryloxyalkyl-functional silane of formula

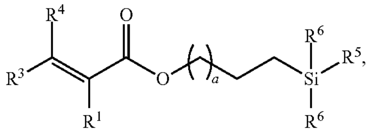

where $R^1$, $R^3$, $R^4$, $R^5$, $R^6$, and subscript a are as defined above;

(2) hydrolyzing compounds comprising (F) the (meth)acryloxyalkyl-functional silane prepared in step (1);

(G) water; and (H) an organosilane of formula $R^2{}_3SiR^5$, where $R^5$ is as described above, and each $R^2$ is independently selected from the group consisting of alkyl and aryl; thereby forming a hydrolysis product; and (3) removing all or a portion of the water from the hydrolysis product which comprises (K) the siloxane-(meth)acrylate macromonomer and a by-product comprising (L) a high boiling oligomer of unit formula

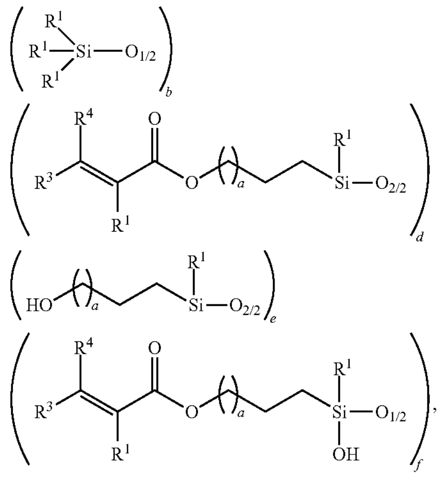

where $R^1$, $R^3$, $R^4$, and subscript a are as described above, subscript b is 0, 1, or 2, subscript f is 0, 1, or 2, a quantity (b+f)=2, and subscript d is 2 to 10, subscript e is 0 to 9, and a quantity (d+e) is 2 to 10; and (M) a low boiling oligomer of formula $R^2{}_3Si—O—SiR^2{}_3$, where $R^2$ is as described above;

(4) neutralizing the hydrolysis product by a technique comprising adding (I) a neutralizing agent; thereby forming a neutralized mixture; and (5) condensing the neutralized mixture by a technique comprising adding (J) a condensation catalyst; thereby preparing a reaction mixture comprising an additional amount of (K) the siloxane-(meth)acrylate macromonomer and additional amount of the by-product comprising (L) the high boiling oligomer and (M) the low boiling oligomer; thereby forming a condensation reaction product.

2. The method of claim 1, where (A) the (meth)acrylate-functional alkenyl compound is selected from the group consisting of allyl acrylate and allyl methacrylate.

3. The method of claim 1, where (B) the hydridosilane is a hydridohalosilane selected from the group consisting of dichloromethylsilane, dimethylchlorosilane, phenyldichlorosilane, diphenylchlorosilane, ethyldichlorosilane, diethylchlorosilane, and a combination of two or more thereof.

4. The method of claim 1, where (C) the hydrosilylation reaction catalyst is selected from the group consisting of (C1) a platinum group metal, (C2) a compound of the platinum group metal, (C3) a complex of the compound with an alkenyl-functional organopolysiloxane oligomer, (C4) the compound microencapsulated in a matrix or coreshell type structure, and (C5) the complex of the compound microencapsulated in a resin matrix.

5. The method of claim 1, where (D) the (meth)acrylate polymerization inhibitor is present, and the (meth)acrylate polymerization inhibitor is selected from the group consisting of (D1) a phenolic compound, (D2) a quinone compound, (D3) a hydroquinone compound, (D4) an N-oxyl compound, (D5) a phenothiazine compound, (D6) a hindered amine compound, and (D7) a combination of two or more of (D1) to (D6).

6. The method of claim 1, where the solvent (E) is present and is selected from the group consisting of aliphatic hydrocarbons, aromatic hydrocarbons, and combinations thereof.

7. The method of claim 1, where step (1) is performed with mixing and heating the starting materials at a temperature of 50° C. to 70° C.

8. The method of claim 1, where (H) the organosilane is selected from the group consisting of chlorotrimethylsilane, triphenylchlorosilane, and a combination thereof.

9. The method of claim 1, where (I) the neutralizing agent is selected from the group consisting of ammonia gas, a carbonate, a bicarbonate, hydrotalcite, or a combination of two or more thereof.

10. The method of claim 1, where (J) the condensation catalyst is selected from the group consisting of sulfuric acid, a sulfonic acid, potassium hydroxide, potassium methoxide, sodium hydroxide, sodium methoxide, a potassium silanolate, and a combination of two or more thereof.

11. The method of claim 1, further comprising: (6) quenching (J) the condensation catalyst by adding (N) a quenching agent to the condensation reaction product, thereby forming a quenched product comprising an inorganic salt of (J) the acid catalyst and (N) the quenching agent.

12. The method of claim 11, where (N) the quenching agent is selected from the group consisting of ammonia gas, a carbonate, a bicarbonate, hydrotalcite, pyridine, imidazole, and/or a hydroxide of a quaternary ammonium cations.

13. The method of claim 1, further comprising: (7) equilibrating (L) the high boiling oligomer and (M) the low boiling oligomer in the presence of (O) an additional condensation catalyst; thereby forming a further additional amount of (K) the siloxane-(meth)acrylate macromonomer.

14. A method for preparing a siloxane-(meth)acrylate macromonomer, wherein the method comprises:

(1) hydrosilylating starting materials comprising (A) a (meth)acrylate-functional alkenyl compound of formula

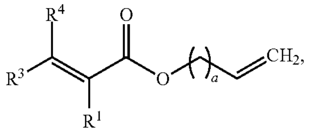

where $R^1$ is selected from the group consisting of H, alkyl, and aryl; $R^3$ is selected from the group consisting of H, alkyl, and aryl; $R^4$ is selected from the group consisting of H, alkyl, and aryl; and subscript a is an integer with a value of 1 to 6; and (B) a hydridohalosilane of formula

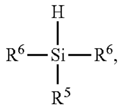

where $R^5$ is halogen, and each $R^6$ is independently selected from the group consisting of halogen and alkyl; in the presence of (C) a hydrosilylation reaction catalyst;

optionally (D) a (meth)acrylate polymerization inhibitor; and optionally (E) a solvent; thereby forming a hydrosilylation reaction product comprising a (meth)acryloxyalkyl-functional halosilane of formula

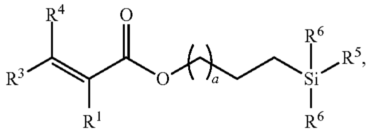

where $R^1$, $R^3$, $R^4$, $R^5$, $R^6$, and subscript a are as defined above;

(2) hydrolyzing compounds comprising (F) the (meth)acryloxyalkyl-functional halosilane prepared in step (1);

(G) water; and (H) an organohalosilane of formula $R^2{}_3SiR^5$, where $R^5$ is as described above, and $R^2$ is alkyl; thereby forming a hydrolysis product;

(3) removing all or a portion of the water from the hydrolysis product which comprises (K) the siloxane-(meth)acrylate macromonomer and a by-product comprising (L) a high boiling oligomer of unit formula

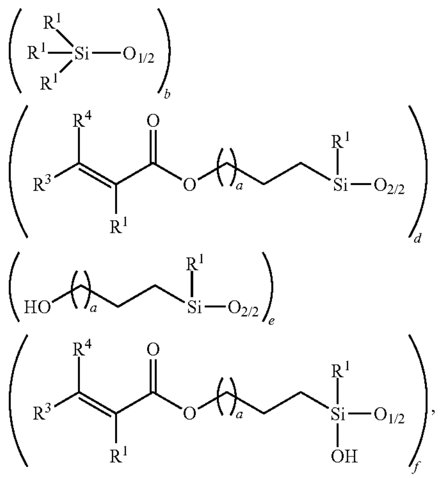

where $R^1$, $R^3$, $R^4$, and subscript a are as described above, subscript b is 0, 1, or 2, subscript f is 0, 1, or 2, a quantity (b+f)=2, and subscript d is 2 to 4, subscript e is 0 or 1, and a quantity (d+e) is 2 to 4; and (M) a low boiling oligomer of formula $R^2{}_3Si—O—SiR^2{}_3$, where $R^2$ is as described above;

optionally (4) neutralizing the hydrolysis product by a technique comprising adding (I) a neutralizing agent; thereby forming a neutralized mixture;

optionally (5) condensing the neutralized mixture by a technique comprising adding (J) a condensation catalyst; thereby preparing a reaction mixture comprising an additional amount of (K) the siloxane-(meth)acrylate macromonomer and additional amount of the by-product comprising (L) the high boiling oligomer and (M) the low boiling oligomer; thereby forming a condensation reaction product; and optionally (6) quenching (J) the condensation catalyst by adding (N) a quenching agent to the condensation reaction product, thereby forming a quenched product comprising an inorganic salt of (J) the acid catalyst and (N) the quenching agent;

optionally (7) equilibrating (L) the high boiling oligomer and (M) the low boiling oligomer in the presence of (O) an additional condensation catalyst (formed in any of the preceding steps); thereby forming a further additional amount of (K) the siloxane-(meth)acrylate macromonomer, where the method further comprises adding additional fresh (M) low boiling oligomer; and (8) recovering (K) the siloxane-(meth)acrylate macromonomer.

15. The method of claim 14, where the method further comprises recovering (L) the high boiling oligomer.

16. The method of claim 14, where the method further comprises recovering (M) the low boiling oligomer.

17. The method of claim 14, where the method further comprises equilibrating (L) the high boiling oligomer and (M) the low boiling oligomer in the presence of (O) an additional acid catalyst, thereby forming an additional amount of the siloxane-(meth)acrylate macromonomer.

* * * * *